Dec. 24, 1957   W. F. HOLIN   2,817,302
RAILWAY VEHICLE ANTI-SEPARATION MEANS
Filed April 10, 1953   2 Sheets-Sheet 1

INVENTOR
William F. Holin
BY
Stanley C. Thorpe
ATTORNEY

Dec. 24, 1957 W. F. HOLIN 2,817,302
RAILWAY VEHICLE ANTI-SEPARATION MEANS
Filed April 10, 1953 2 Sheets-Sheet 2

INVENTOR
William F. Holin
BY
Stanley C. Thorpe
ATTORNEY

United States Patent Office 2,817,302
Patented Dec. 24, 1957

2,817,302

RAILWAY VEHICLE ANTI-SEPARATION MEANS

William F. Holin, Riverside, Ill., assignor to General Motors Corporation, Detroit, Mich., a corporation of Delaware Application April 10, 1953, Serial No. 348,015

1 Claim. (Cl. 105—200)

The invention relates generally to railway vehicles and more particularly to anti-separation means acting between a locomotive body and a locomotive truck to prevent separation of the locomotive body from the locomotive truck and to permit lifting of the locomotive by the body with the locomotive truck hanging thereon.

It is common practice to provide means acting between a locomotive body and its supporting trucks in order to prevent extended separation between locomotive body and trucks when the locomotive is derailed or lifted. The type of anti-separation means used, however, has always been the object of considerable attention due to the numerous factors involved in obtaining a truly superior anti-separation means. For example, the anti-separation means must be extremely durable and capable of withstanding heavy loads, it must take up an absolute minimum of space, and since it must act at a relatively inaccessible portion of the locomotive, it must be built so that it can be quickly rendered effective or ineffective at vantage points which are readily accessible. While there are numerous types of anti-sepaartion means in use today, they are all defective in one or more of the above respects.

It, therefore, becomes an object of this invention to provide an anti-separation means acting between a locomotive body and its supporting trucks which will allow the desired movement between truck and body during normal locomotive operation, which is positive in its lifting action, which is simple to install and takes up a minimum of room, and which can be quickly rendered effective or ineffective at readily accessible vantage points.

Figure 1:
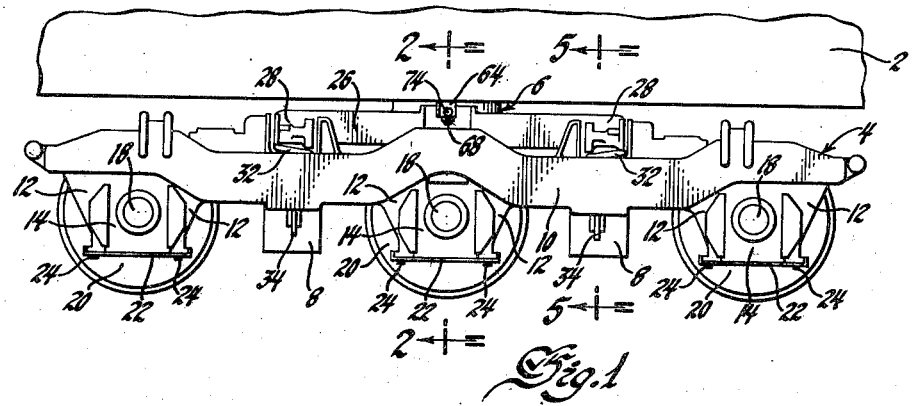
Figure 1 is a side view of a portion of a locomotive showing the locomotive body with a supporting truck attached thereto.

Referring now to Fig. 1, a locomotive body indicated generally by the numeral 2 is shown which may be supported on the truck 4 by the pivot means 6. The truck 4 includes the usual transversely extending transom members 8 maintaining a pair of longitudinally extending side frame members 10 in parallel relationship with each other. The side frame members 10 are provided with sets of downwardly extending pedestals 12 which embrace journal box assemblies 14. The journal boxes 14 resiliently support the side frame members 10 by means of helical coil springs 16 interposed therebetween. Supporting the journal boxes 14 for relative rotation with respect thereto are the usual axles 18 having supporting wheels 20 pressed thereon. In order to assure that the axle and wheel sets with the journal boxes 14 will be lifted when the rest of the truck is lifted, pedestal tie bars 22 are secured to the lower ends of the pedestal sets 12 by means of bolt and nut assemblies 24. Resiliently supported on the transom frame members 8 inside the longitudinally extending side frame members 10 are the longitudinally spaced transversely extending arms 28 of a truck bolster 26.

Figure 5:
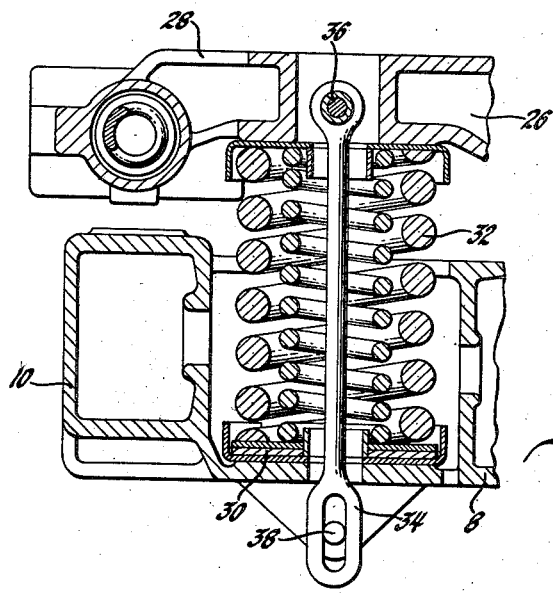
Figure 5 is a view taken on the line 5—5 of Fig. 1 and shows the manner in which the bolster is movably secured to the truck frame so that when the anti-separating means acts to lift the bolster when the locomotive body is lifted the remaining portions of the truck assembly will also be lifted.

Referring now to Fig. 5 the particular manner in which the bolster arms 28 are supported on the truck frame and attached thereto will be described. Formed in each of the transoms 8 are a pair of transversely disposed spring seats 30. Seated on the spring seats 30 and engaging the underside of each bolster arm 28 are helical coil spring sets 32 which serve to resiliently support the bolster 26 on the truck frame. In order to assure only limited separation of bolster and frame when the bolster is lifted upwardly, a bolster tie bar 34 is provided which is fastened to each bolster arm 28 by means of a pin and sleeve assembly 36. The lower end of the tie bar 34 is fastened to the other side of the transom frame members 8 by means of a clevis-like structure and a pin or bolt assembly 38 extending through an elongated slot in the tie bar 34. The purpose of the elongated slot is of course to allow limited movement both vertical and lateral of the bolster 26 with respect to the truck frame during normal locomotive operation.

Figure 2:
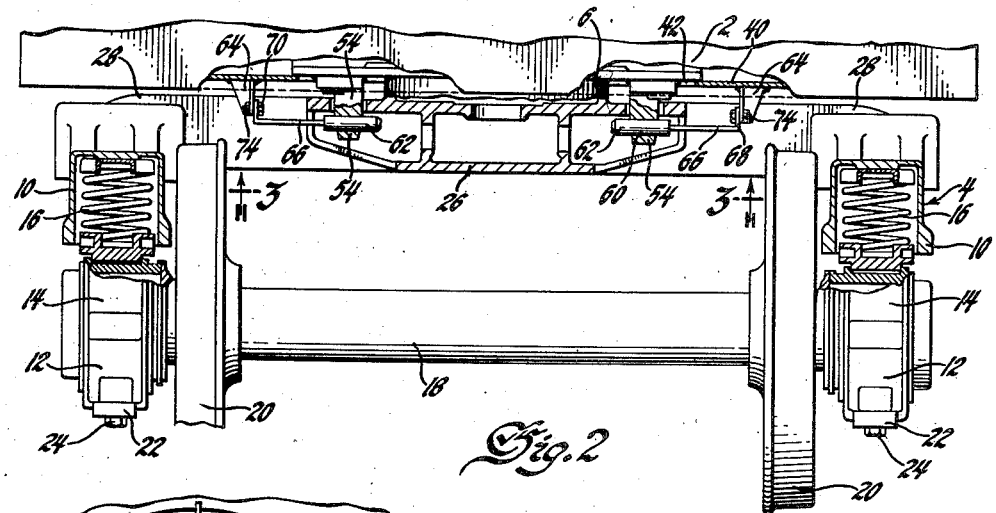
Figure 2 is a transverse section taken on the line 2—2 of Fig. 1 with certain portions of the vehicle body broken away to show the anti-separation means fastened to the bottom and center plates of the locomotive body including a pair of oppositely disposed depending lugs extending through suitable holes in the truck bolster.
Figure 3:
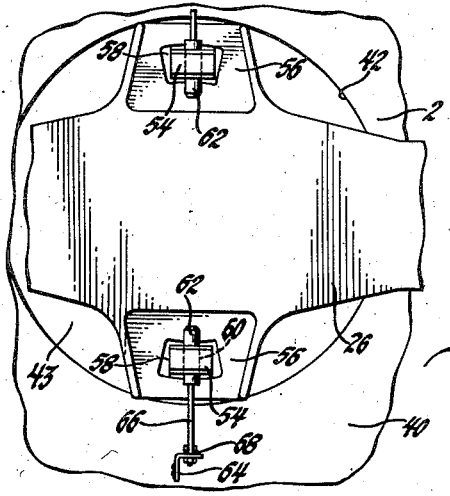
Figure 3 is a view taken on the line 3—3 of Fig. 2 and shows the underside of the bolster and the manner in which the depending lugs fastened to the underside of the locomotive body extend through the oppositely disposed holes in the bolster and have locking pins inserted therein.
Figure 4:
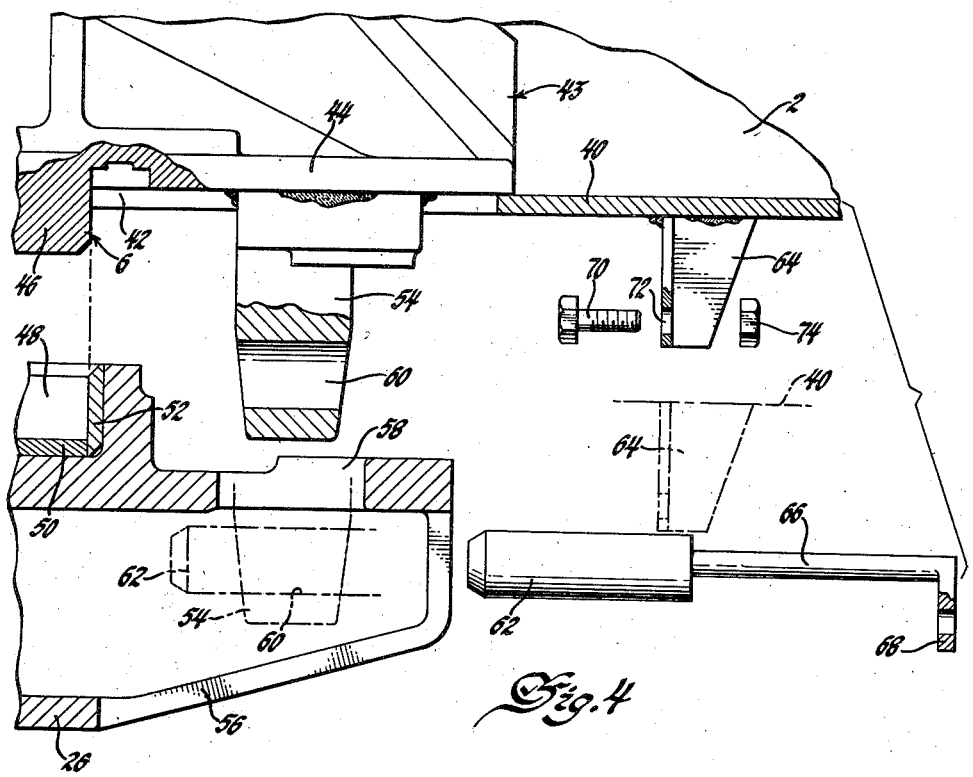
Figure 4 is an exploded view similar to that shown in Fig. 2 and shows how the vehicle body may be quickly and easily movably secured to the truck bolster by the new anti-separating means.

Referring now more particularly to Figs. 2, 3, and 4, the pivoting structure for supporitng the locomotive body on the truck bolster and the new anti-separating structure will be described in detail. The locomotive body 2 has a bottom plate 40 provided with an opening 42 in the center thereof over which is positioned the body center plate assembly 43, which may be suitably fastened to the bottom plate 40 as by welding, etc. The body center plate assembly 43 includes a body center plate 44 having a depending center bearing pin 46 extending through the opening 42. Adapted to receive the depending center bearing 46 is a center bearing means located in the center of the bolster 26 which includes the cylindrical bearing recess 48 lined with a wear plate 50 and a vertical wear plate ring 52. Suitably fastened by welding etc. to the body center plate 44 are a pair of oppositely disposed lugs 54 which also extend through the opening 42 in the bottom plate 40. Formed as lateral projections on the longitudinally extending portion of the bolster 26 at the center thereof are a pair of oppositely disposed ribbed plates 56 each provided with an arcuately shaped slot 58 extending therethrough through which the depending lugs 54 may extend. The arcuate slots 58 are so shaped to allow limited swinging movement of the bolster 26 with respect to the locomotive body 2. It will be noted that each of the depending lugs 54 is provided with a horizontal pin hole 60 into which an elongated pin 62 may be inserted to prevent extended withdrawal of the lugs 54 from the arcuate slots 58.

In order to prevent the pin 62 from working itself out of the pin hole 60 once it has been inserted, an angular fastening member 64 is welded or otherwise secured to the underside of the bottom plate 40 outside of the horizontal outline of the bolster 26. The fastening member 64 provides a fastening means near the outer side of the locomotive to which the pin 62 may be fastened by means of an extended shank 66 having a holed flange 68 on its one end. This is accomplished by inserting the bolt 70 in the hole in flange 68 and a hole 72 in fastening member 64 and tightening a nut 74 thereon.

It may now be appreciated that an anti-separation means has just been described in detail which has the following advantages: it is very simple, it may be rendered effective to provide a positive lifting and fastening action without obstructing the necessary swinging movement which must take place between bolster and body during normal locomotive operation, the anti-separating means may be quickly rendered effective or ineffective at a readily accessible vantage point at the side of the locomotive, the anti-separating assembly when rendered ineffective allows the locomotive body and the truck to be separated by relative vertical movement of body and truck which is the most practical manner for separating these two structures, and the anti-separating means requires a minimum of room in an area normally congested with appendages and parts which are necessary for the successful operation of a locomotive.

I claim:

In a railway vehicle including a vehicle body and a supporting truck assembly therefor, said truck assembly comprising longitudinally extending frame members spaced below the respective sides of the body, wheel and axle sets journaled by said frame members on the opposite sides thereof from said body, and a bolster having arms connected to and carried by said side frames and a central portion extending upwardly therefrom to the underside of said body, said body having a depending bearing journaled by said bolster portion, a depending lug spaced transversely of the vehicle from said bearing and secured to the underside of said body, said lug having a transversely extending aperture therein accessible from between one of said side frames and the vehicle body, said bolster portion having a transversely extending plate with an elongated slot through which said lug extends when the body is normally supported by the truck assembly, a pin removably insertable in the aperture of said lug below said plate to prevent withdrawal of the body from said bolster, said pin having a rod-like extension from its end most remote from said bearing, a bracket depending from the body opposite the end of said extension, and means releasably securing said extension end to said bracket whereby convenient manipulation of said pin to engage and disengage said lug is afforded from the side of the vehicle.

References Cited in the file of this patent

UNITED STATES PATENTS

| | | |
|---|---|---|
| 799,316 | Edwards | Sept. 12, 1905 |
| 1,096,367 | Head | May 12, 1914 |
| 1,431,239 | Lamont | Oct. 10, 1922 |
| 1,640,075 | Harris | Aug. 23, 1927 |
| 1,667,030 | Campbell | Apr. 24, 1928 |
| 1,685,164 | Johnson | Sept. 25, 1928 |
| 1,730,860 | Miner | Oct. 8, 1929 |
| 1,761,266 | Johnston et al. | June 3, 1930 |
| 1,877,029 | O'Connor | Sept. 13, 1932 |
| 2,128,281 | Blomberg | Aug. 30, 1938 |
| 2,152,032 | Rice | Mar. 28, 1939 |

FOREIGN PATENTS

| | | |
|---|---|---|
| 114,496 | Great Britain | Apr. 11, 1918 |